US012734557B2

(12) United States Patent
Korathu-Larson

(10) Patent No.: US 12,734,557 B2
(45) Date of Patent: Sep. 15, 2026

(54) AUGER ASSEMBLY

(71) Applicant: Rory Korathu-Larson, LLC, Seattle, WA (US)

(72) Inventor: Rory Korathu-Larson, Seattle, WA (US)

(73) Assignee: Rory Korathu-Larson LLC, Seattle, WA (US)

( * ) Notice: Subject to any disclaimer, the term of this patent is extended or adjusted under 35 U.S.C. 154(b) by 699 days.

(21) Appl. No.: 18/313,801

(22) Filed: May 8, 2023

(65) Prior Publication Data

US 2023/0356305 A1 Nov. 9, 2023

Related U.S. Application Data

(60) Provisional application No. 63/339,123, filed on May 6, 2022.

(51) Int. Cl.

*B23B 51/00* (2006.01)
*B08B 1/16* (2024.01)
*B23B 51/02* (2006.01)

(52) U.S. Cl.

CPC .................................. *B08B 1/165* (2024.01)

(58) Field of Classification Search

CPC ............................. B08B 1/165; B23D 79/04
See application file for complete search history.

(56) References Cited

U.S. PATENT DOCUMENTS

2019/0032412 A1* 1/2019 Banjo .................... E21B 7/008

* cited by examiner

*Primary Examiner* — Marc Carlson
(74) *Attorney, Agent, or Firm* — Timothy John Billick; Robert Roth

(57) ABSTRACT

An auger includes a cylindrical body, a first channel helically defined in the cylindrical body, and a second channel helically defined in the cylindrical body. The auger further includes a first conduit defined in the cylindrical body. The first conduit includes a first sloped portion. The auger further includes a second conduit defined in the cylindrical body. The second conduit includes a second sloped portion. The auger further includes a first end mill formed in a first cavity defined in the cylindrical body, and a second end mill formed in a second cavity defined in the cylindrical body.

20 Claims, 6 Drawing Sheets

AUGER ASSEMBLY

CLAIM OF PRIORITY

The present application claims priority to U.S. Provisional Application Ser. No. 63/339,123, filed on May 6, 2022, entitled Auger Assembly, the disclosure of which is hereby incorporated herein by reference as if set forth in its entirety.

TECHNICAL FIELD

The present disclosure relates generally to an auger assembly. Specifically, the present disclosure relates to systems and methods related to an interlocking, self-aligning, torque aligning, and modular auger assembly.

BACKGROUND

Augers may include any rotating, helical screw. Augers have been used throughout history as a helical screw blade to bore into materials by rotating a shaft of the auger such that a helical blade of the auger scraps or cuts into the material. Further, a helical screw blade auger may move the cut material away from the area at which the helical screw blade auger is being used to cut the material including within a bore created by the helical screw blade auger. Further, an auger referred to as an Archimedes' screw may be housed within a cylinder wherein the helical screw blade referred to as a flighting may move a liquid and/or granular materials through the length of the cylinder. In some applications, it may be useful to remove material that may build up on the interior walls of the cylinder.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
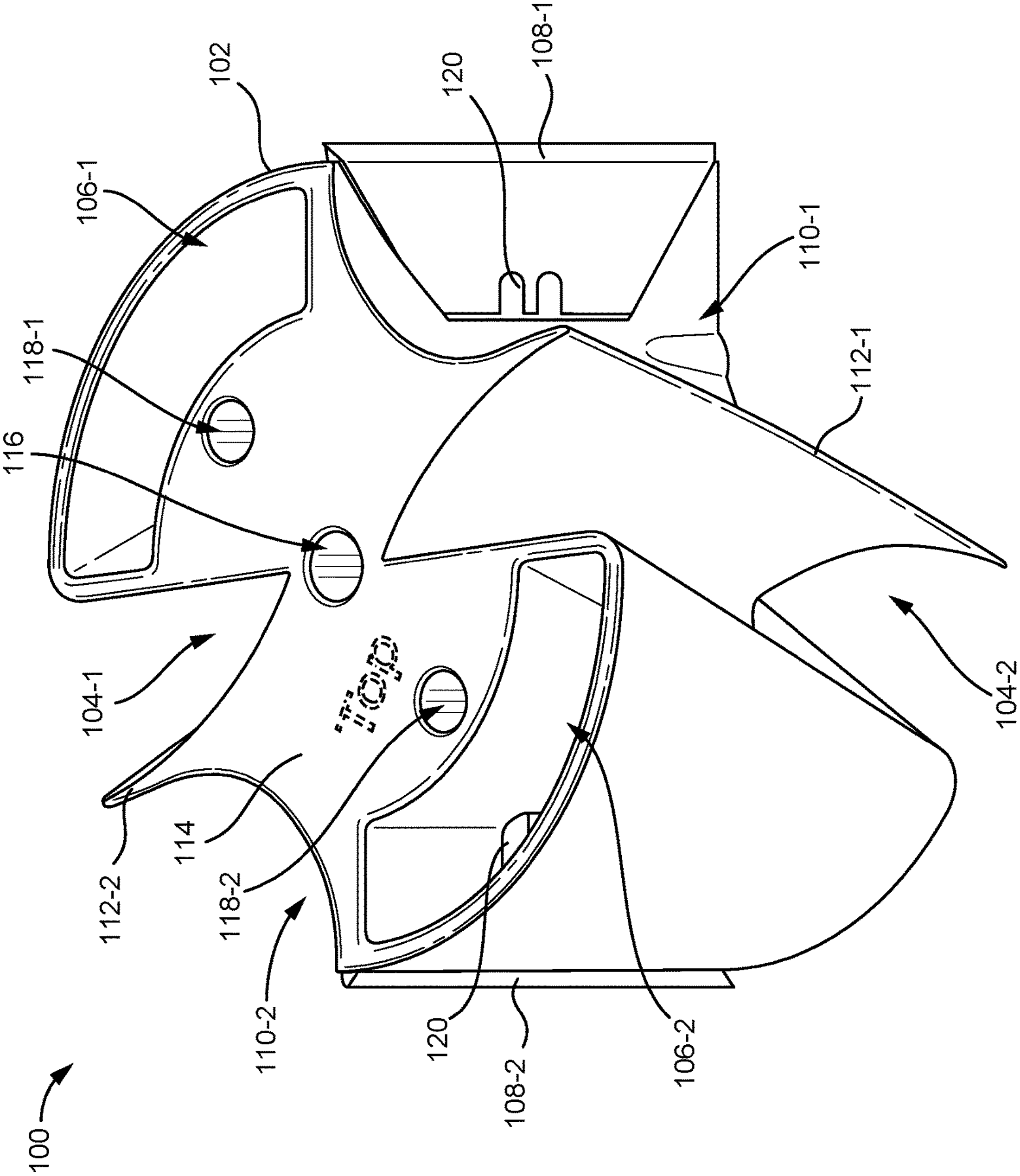
FIG. 1 illustrates a top isometric view of an auger, according to an example of the principles described herein.

As described above, augers may include any rotating, helical screw. The auger may be housed in a cylindrical housing to move material through the cylindrical housing. In some examples, the auger may also be used to remove material from the inside of the cylindrical housing. The rotation of the auger within the cylindrical housing causes the material to be pulled from the sides of the cylindrical housing. Further, the material may be moved from a first end of the cylindrical housing to a second end of the cylindrical housing. In some examples, the auger and cylindrical housing may be used to create pressure in the material being moved through the cylindrical housing by forcing the material to the second end of the cylindrical housing.

Although the present systems and methods may be used in a myriad of different use cases, in one example, the auger and cylindrical housing may form part of a cryogenic fluid device where a cryogenic fluid is exposed to a heat exchange system that causes the cryogenic fluid to freeze and form crystals on an internal wall of the cylindrical housing. The auger may be equipped with a scraping device (e.g., an end mill) that may scrape the frozen cryogenic fluid from the interior wall of the cylindrical housing. In one example, the auger may include a plurality of scraping devices (e.g., a plurality of end mills). The auger may also move the scraped and frozen cryogenic fluid from the first end of the cylindrical housing or an intermediate portion thereof to a second end of the cylindrical housing. Thus, the auger may include a flighting used to push the material through the cylinder housing and expel the scraped and frozen cryogenic fluid from the cylindrical housing. In one example, the auger may include a plurality of flightings.

The scrapping of the cryogenic fluid from an interior wall of the cylindrical housing via the end mills may be used to create a desired size and shape of ice particles at and/or with a desired temperature such that a resulting slurry may be more effective when used as a therapeutic.

Examples described herein provide an auger including a cylindrical body, a first channel helically defined in the cylindrical body, and a second channel helically defined in the cylindrical body. The auger may further include a first conduit defined in the cylindrical body. The first conduit may include a first sloped portion. The auger may further include a second conduit defined in the cylindrical body. The second conduit may include a second sloped portion. The auger may further include a first end mill formed in a first cavity defined in the cylindrical body and a second end mill formed in a second cavity defined in the cylindrical body.

The first channel may be located approximately 180 degrees around the cylindrical body with respect to the second channel. The first conduit may be located approximately 180 degrees around the cylindrical body with respect to the second conduit. The first conduit and the second conduit may be closed with respect to a radial exterior of the cylindrical body. The first cavity may be located approximately 180 degrees around the cylindrical body with respect to the second cavity.

The first cavity and the second cavity may be formed such that the first end mill and the second end mill coupled to the first cavity and the second cavity, respectively, are at least one of aligned with an axis of the cylindrical body, have a positive rake angle, have an axial rake angle, and combinations thereof. The first end mill and the second end mill may be indexable with respect to the first cavity and the second cavity, respectively.

The auger may further include a center aperture defined in the cylindrical body along an axis of the cylindrical body and at a center of the cylindrical body. The auger may further include a first primary alignment aperture defined in a first end of the cylindrical body, a second primary alignment aperture defined in the first end of the cylindrical body, a first secondary alignment aperture defined in a second end of the cylindrical body opposite the first end, and a second secondary alignment aperture defined in the second end of the cylindrical body.

Examples described herein also provide an auger system. The auger system may include a first auger, a drive shaft, and a second auger axially coupled to the first auger via the drive shaft. The first auger may include a first cylindrical body, a first channel helically defined in the first cylindrical body, and a second channel helically defined in the first cylindrical body. The first auger may further include a first conduit defined in the first cylindrical body. The first conduit may include a first sloped portion. The first auger may further include second conduit defined in the first cylindrical body. The second conduit may include a second sloped portion. The first auger may further include a first end mill formed in a first cavity defined in the first cylindrical body, and a second end mill formed in a second cavity defined in the first cylindrical body. The second auger may include a second cylindrical body, a third channel helically defined in the second cylindrical body, and a fourth channel helically defined in the second cylindrical body. The second auger may further include a third conduit defined in the second cylindrical body. The third conduit may include a third sloped portion. The second auger may further include a fourth conduit defined in the second cylindrical body. The fourth conduit may include a fourth sloped portion. The second auger may further include a third end mill formed in a third cavity defined in the second cylindrical body, and a fourth end mill formed in a fourth cavity defined in the second cylindrical body.

The third conduit of the first auger may open into the first cavity of the second auger, and the second conduit of the first auger may open into the second cavity of the second auger. The first auger may further include a first primary alignment aperture defined in a first end of the first auger, a second primary alignment aperture defined in the first end of the first auger, a first secondary alignment aperture defined in a second end of the first auger opposite the first end, and a second secondary alignment aperture defined in the second end of the first auger. The second auger further may include a third primary alignment aperture defined in a first end of the second auger, a fourth primary alignment aperture defined in the first end of the second auger, a third secondary alignment aperture defined in a second end of the second auger opposite the first end, and a fourth secondary alignment aperture defined in the second end of the second auger.

The auger system may further include a first coupling device coupling the first auger to the second auger via the first coupling device engaging with the first primary alignment aperture of the first auger and the third secondary alignment aperture of the second auger, and a second coupling device coupling the first auger to the second auger via the second primary alignment aperture of the first auger coupling to the fourth secondary alignment aperture of the second auger. The first coupling device and the second coupling device may include at least one, or, in one example, a plurality of interlocking dowels interfacing with the first primary alignment aperture, the third secondary alignment aperture, the second primary alignment aperture, and the fourth secondary alignment aperture, respectively.

The first channel helically defined in the first auger may align with the third channel helically defined in the second auger, and the second channel helically defined in the first auger may align with the fourth channel helically defined in the second auger. The first conduit defined in the first auger aligns with the third conduit defined in the second auger and the second conduit defined in the first auger aligns with the fourth conduit defined in the second auger.

The first cavity, the second cavity, the third cavity, and the fourth cavity may be formed such that the first end mill, the second end mill, the third end mill, and the fourth end mill coupled to the first cavity, the second cavity, the third cavity, and the fourth cavity, respectively, are at least one of aligned with an axis of the first cylindrical body and the second cylindrical body, have a positive rake angle, have an axial rake angle, and combinations thereof. The first end mill, the second end mill, the third end mill, and the fourth end mill are indexable with respect to the first cavity, the second cavity, the third cavity, and the fourth cavity, respectively.

The auger system may further include a first center aperture defined in the first cylindrical body along an axis of the first cylindrical body and at a center of the first cylindrical body, and a second center aperture defined in the second cylindrical body along the axis of the second cylindrical body and at a center of the second cylindrical body. The first conduit, the second conduit, the third conduit, and the fourth conduit may be closed with respect to a radial exterior of the first or second cylindrical body.

Overview

In the examples described herein, an auger assembly may include at least one, and, in one example, a plurality of auger sections. The auger sections may include primary and secondary alignment features that interlock with one another in order to align the axis of the auger sections. Further, the auger assembly may include a self-aligning and torque transmitting coupler assembly. The coupler assembly may include an outer coupler coupled to a first shaft and an inner coupler coupled to a second shaft. The outer coupler may include an inner surface having primary and secondary alignment and torque transmitting features. The inner coupler may include an outer surface having primary and secondary alignment features. The primary and secondary alignment features are configured to interlock and facilitate alignment of the first and second shafts along a common axis.

Additionally, the techniques described in this disclosure may be performed as a method and/or by a system that performs the techniques described herein.

Example Embodiments

Figure 2:
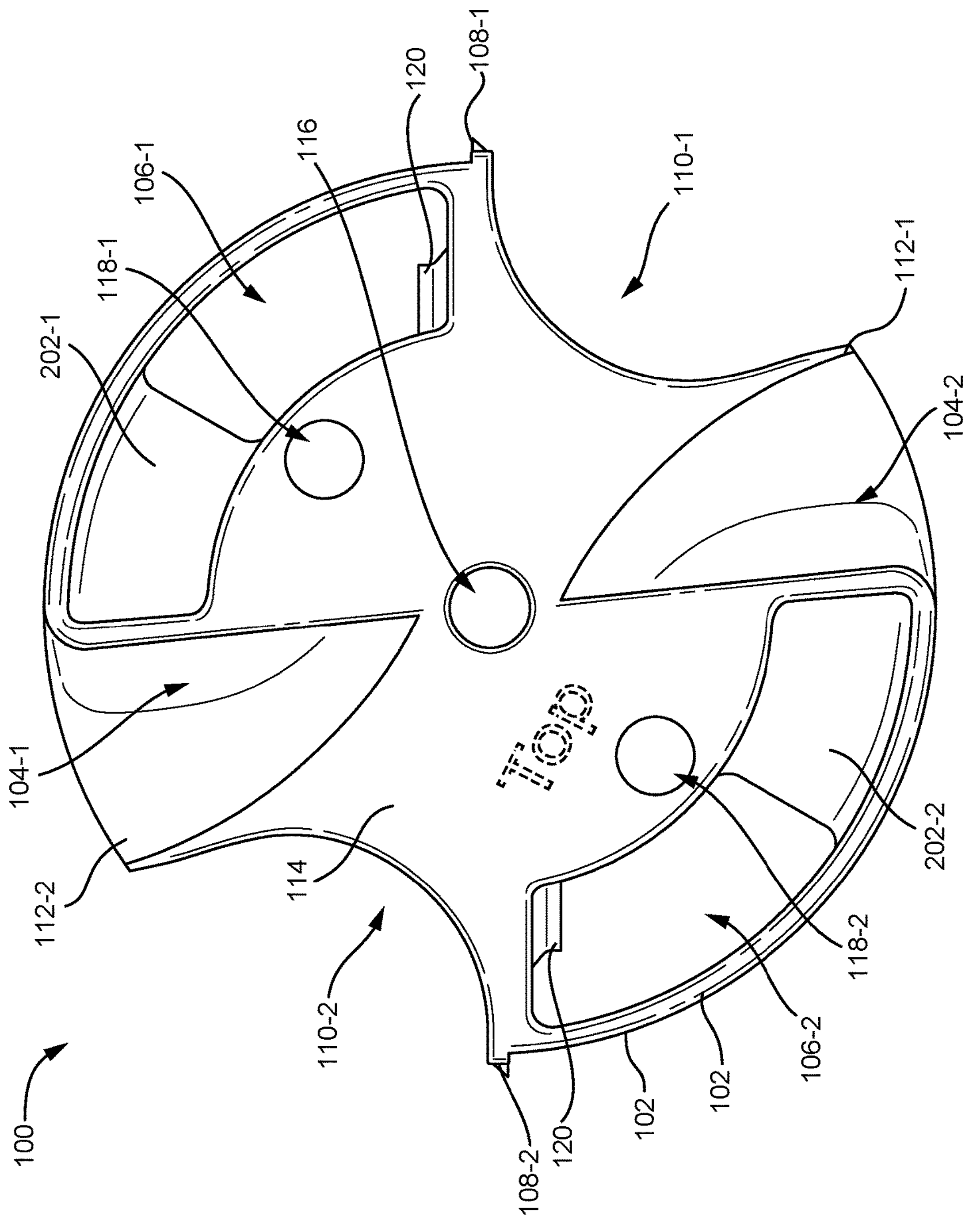
FIG. 2 illustrates a top view of an auger, according to an example of the principles described herein.
Figure 3:
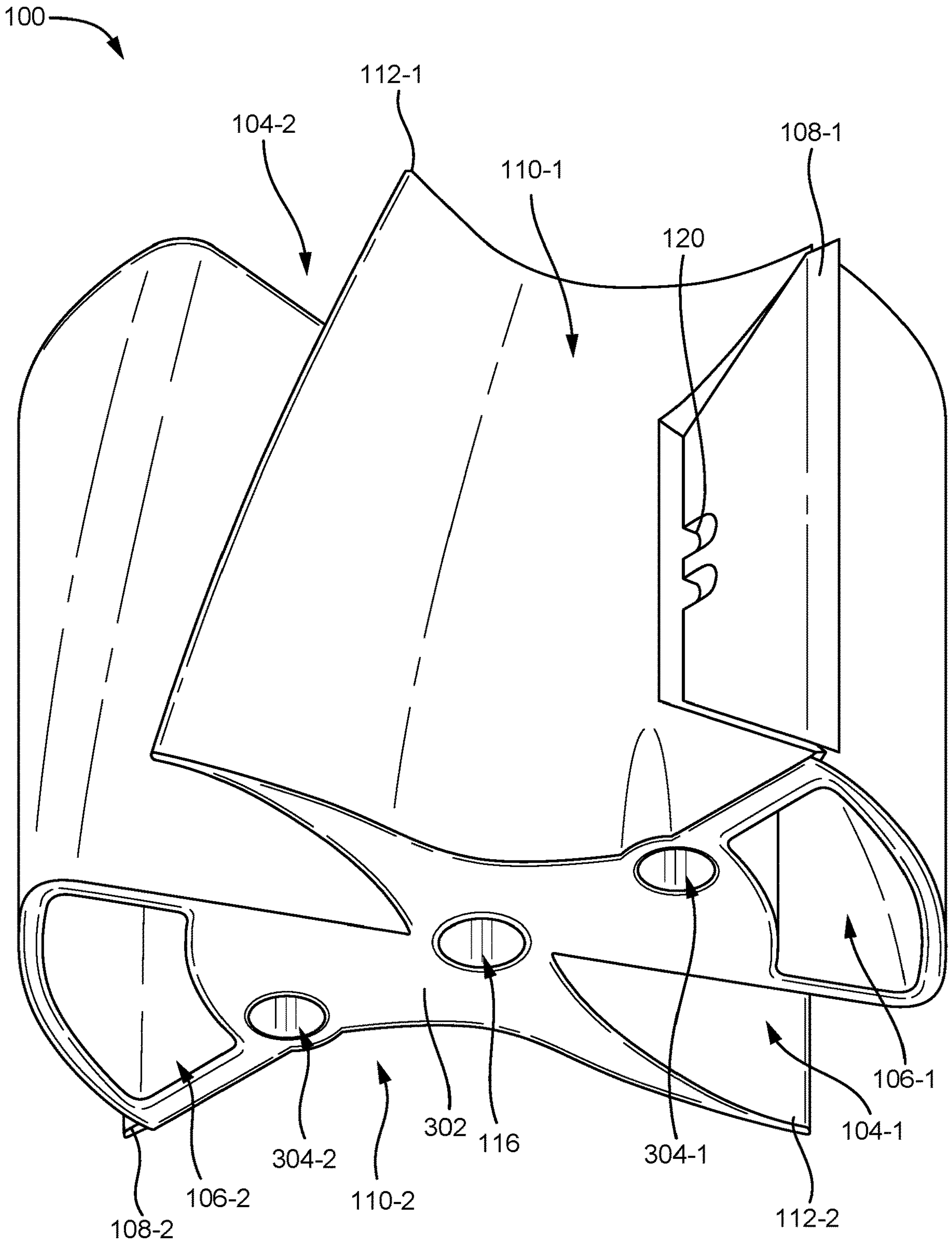
FIG. 3 illustrates a bottom isometric view of an auger, according to an example of the principles described herein.
Figure 4:
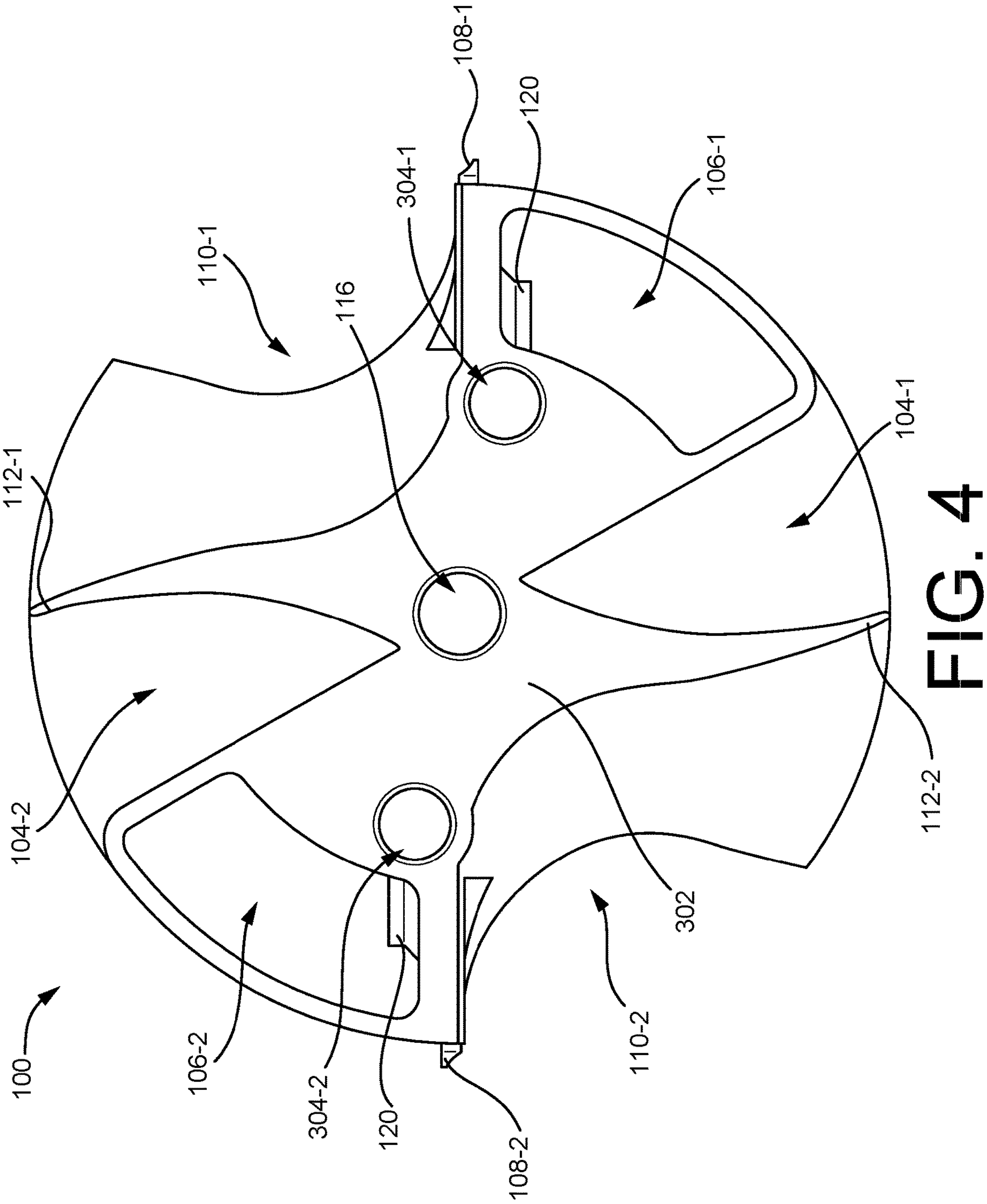
FIG. 4 illustrates a bottom view of an auger, according to an example of the principles described herein.
Figure 5:
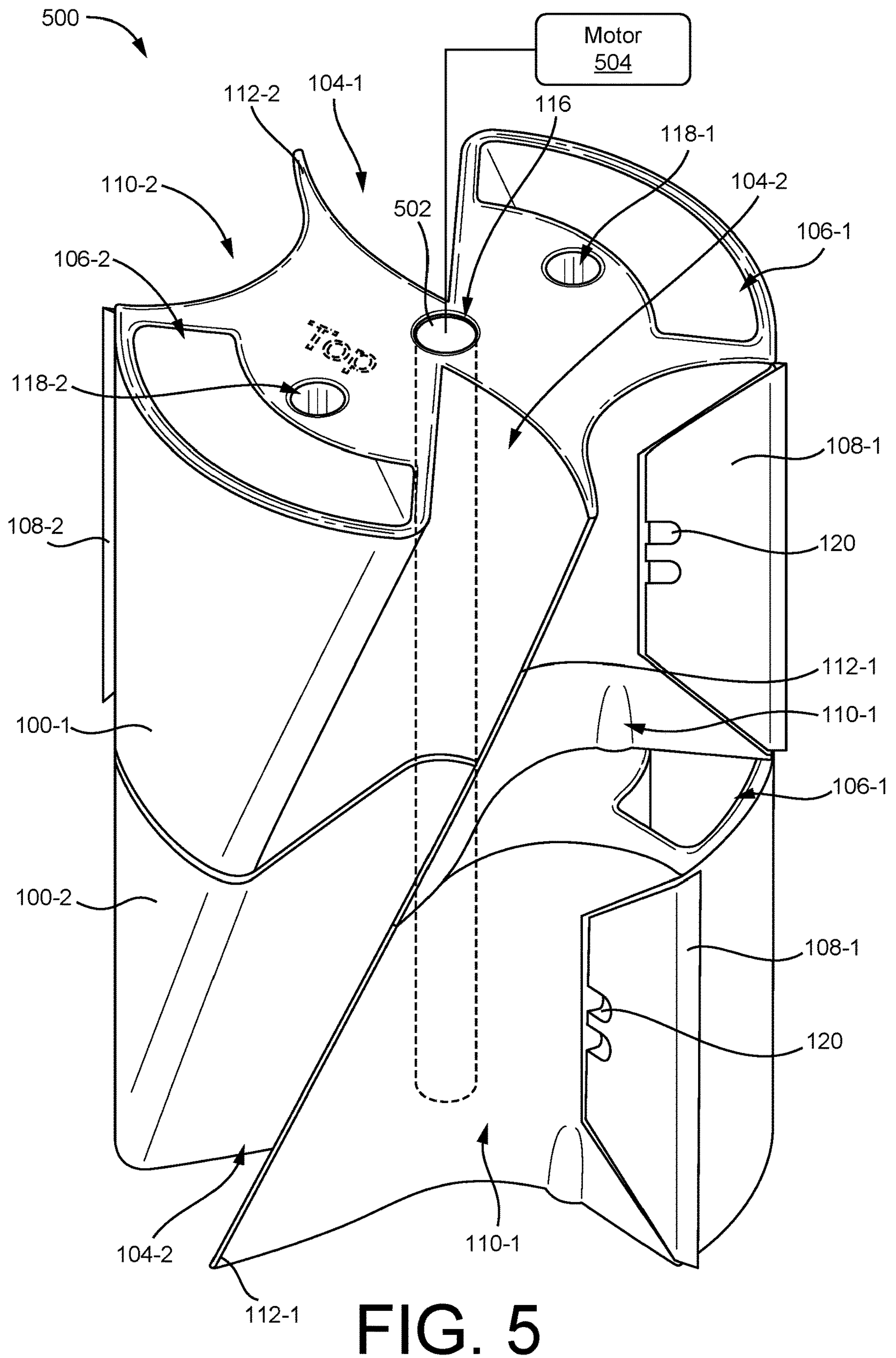
FIG. 5 illustrates an isometric view of an auger assembly, according to an example of the principles described herein.
Figure 6:
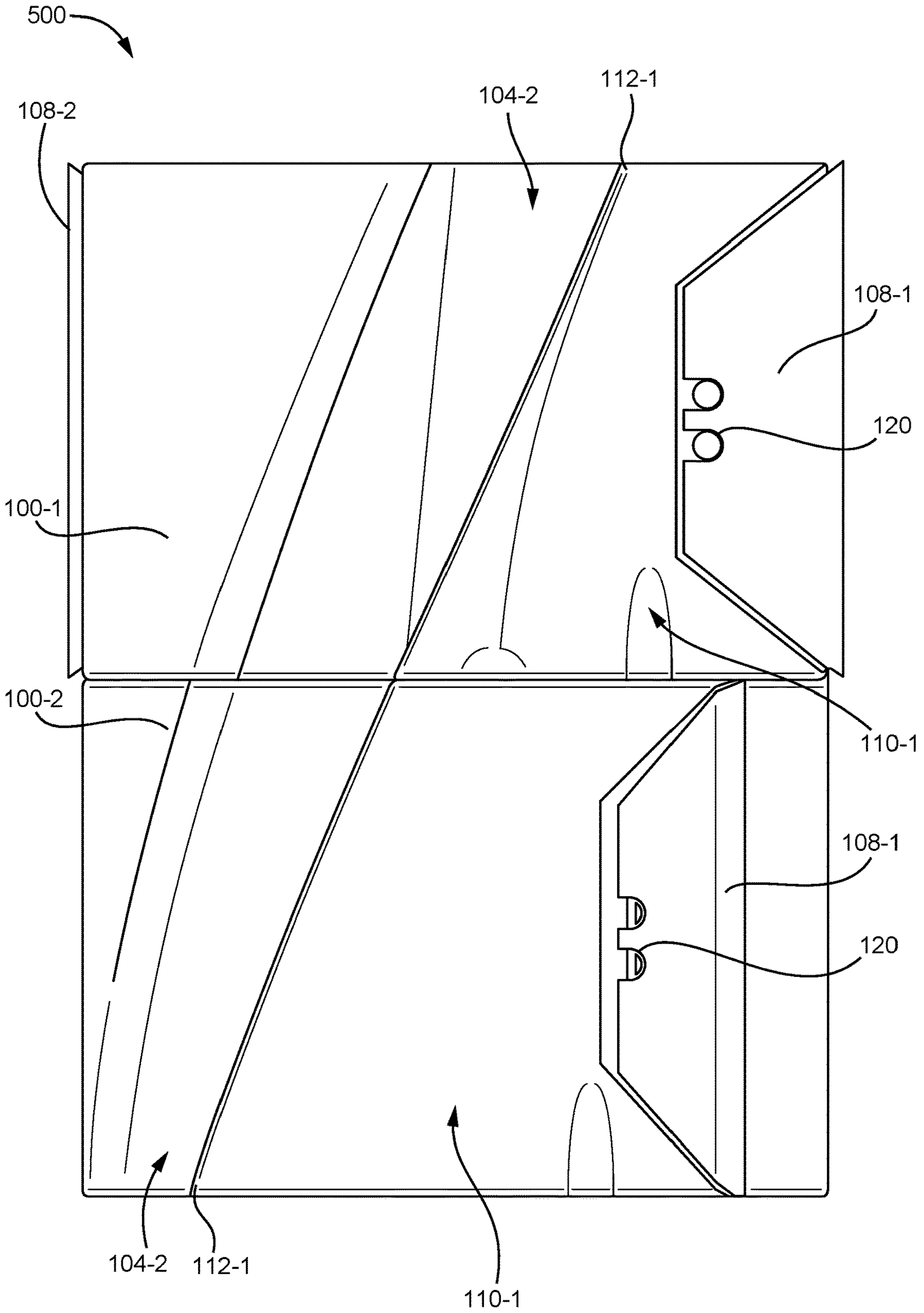
FIG. 6 illustrates a side view of an auger assembly, according to an example of the principles described herein.

Turning now to the figures, FIG. 1 illustrates a top isometric view of an auger 100, according to an example of the principles described herein. FIG. 2 illustrates a top view of the auger 100, according to an example of the principles described herein. FIG. 3 illustrates a bottom isometric view of the auger 100, according to an example of the principles described herein. FIG. 4 illustrates a bottom view of the auger 100, according to an example of the principles described herein. FIG. 5 illustrates an isometric view of an auger assembly, according to an example of the principles described herein. FIG. 6 illustrates a side view of the auger assembly, according to an example of the principles described herein. FIG. 3 illustrates the openings of the inner pathway of the conduits 106 (e.g., channels, cavities, tunnels, etc.) which creates a secondary material pass-through for additional propulsion and expulsion of material (e.g., the fluid and/or slurry) to the top or the bottom of the auger stack depending on a clockwise or a counterclockwise rotation. FIG. 4 illustrates a bottom birds-eye view of a singular modular auger 100. FIG. 6 illustrates two modular augers 100 connected to create a longer auger stem demonstrating the indexable and changeable end mills 108 with positive and axial rake angles allowing indexing and changeout. The modular augers 100 incorporate the combination of positive/positive rake angles with eccentric relief.

An auger 100 may include a cylindrical body 102 that includes features that align with and/or project to an outer circumference defined by the cylindrical body 102. In the examples described herein, the auger 100 and the features of the auger described herein may be formed via a variety of manufacturing processes including any material deposition or material extraction process. For example, the auger 100 and any portion of its cylindrical body 102 may be formed via casting processes (e.g., die casting, continuous casting, evaporative-pattern casting, investment casting, permanent mold casting, resin casting, sand casting, shell molding, centrifugal casting, slush casting, vacuum molding, etc.), laser engraving, chemical vapor deposition, sputter deposition, compaction plus sintering processes, hot isostatic pressing, metal injection molding, spray forming, injection molding, compression molding, transfer molding, extrusion molding, blow molding, dip molding, rotational molding, thermoforming, laminating processes, forging, pressing bending, shearing, milling, turning, drilling, reaming, sawing, broaching, shaping, planning, honing, abrasive blasting, buffing, burnishing, electroplating, electropolishing, magnetic field-assisted finishing, etching, linishing, tumbling, vibratory finishing, plating, polishing, superfinishing, routing, hobbing, ultrasonic machining, electrical discharge machining (EDM), electron beam machining, electrochemical machining, chemical machining, photochemical machining, laser cutting, grinding, welding, brazing, soldering, sintering, adhesive bonding, fastening, press fitting, three-dimensional (3D) printing (e.g., vat photopolymerization, material jetting, binder jetting, powder bed fusion, material extrusion, directed energy deposition, sheet lamination, etc.), other forms of material deposition or material removal processes.

A first channel 104-1 may be helically defined in the cylindrical body 102. Further, a second channel 104-2 may be helically defined in the cylindrical body 102. The first channel 104-1 and the second channel 104-2 may cause any material within a cylinder in which the auger 100 is housed to move from a first end of the cylinder to a second end of the cylinder. The first channel 104-1 and the second channel 104-2 may be referred to herein generally as a channel 104.

A first conduit 106-1 may be defined in the cylindrical body 102. The first conduit 106-1 includes a first sloped portion 202-1 formed therein. The auger 100 may also include a second conduit 106-2 defined in the cylindrical body 102. The second conduit 106-2 may include a second sloped portion 202-2 formed therein. The first sloped portion 202-1 and the second sloped portion 202-2 create a taper through the first conduit 106-1 and the second conduit 106-2, respectively such that an opening of the first conduit 106-1 and the second conduit 106-2 in a first end (e.g., top 114) is relatively larger than the second end (e.g., bottom 302) of the cylindrical body 102. In this manner, the first sloped portion 202-1 and the second sloped portion 202-2 serve to push the fluid and/or slurry as the auger 100 is rotated. The first conduit 106-1 and the second conduit 106-2 may be referred to herein generally as conduit(s) 106. The first sloped portion 202-1 and the second sloped portion 202-2 create a secondary material pass-through for additional propulsion of materials via the auger 100. The first sloped portion 202-1 and the second sloped portion 202-2 may be referred to herein generally as sloped portion(s) 202.

The auger 100 may also include one or more end mills 108 such as, for example, a utility blade, such as a replaceable utility blade, or other structure having a refined edge suitable for scraping. In one example, the end mills 108 may include replaceable utility blades to ensure that the end mills 108 are continually able to scrape frozen cryogenic fluid (e.g., the cryogenic slurry) from the interior wall of the cylindrical housing in which the auger 100 is housed and rotated. In one example, the end mills 108 may be replaceably coupled to the auger 100 to allow for the exchange of any worn end mills 108 with new, replacement end mills 108. More details regarding the end mills 108 are described herein.

In an embodiment as depicted, a first end mill 108-1 may be disposed in a first cavity 110-1 defined or pre-formed in the cylindrical body 102. The first end mill 108-1 may be oriented such that the refined edge thereof is vertically aligned with, and radially offset from, a central axis to the cylindrical body 102. A second end mill 108-2 may be disposed in a second cavity 110-2 defined or pre-formed in the cylindrical body 102 and may be oriented similarly to the first end mill 108-1 with respect to the cylindrical body, albeit on an opposite side therefrom. The first end mill 108-1 and the second end mill 108-2 may be referred to herein generally as end mill(s) 108. In one example, the auger may include one or more of the first cavity 110-1, the second cavity 110-2, or more cavities than the first cavity 110-1 and the second cavity 110-2 defined or pre-formed in the cylindrical body 102. In this example, a corresponding number of end mills 108 may be coupled to the cavities defined or pre-formed in the cylindrical body 102.

The first channel 104-1 may be located approximately 180 degrees around the cylindrical body 102 with respect to the second channel 104-2. The first conduit 106-1 may be located approximately 180 degrees around the cylindrical body 102 with respect to the second conduit 106-2. The first conduit 106-1 and the second conduit 106-2 may be closed with respect to a radial exterior of the cylindrical body 102. The first cavity 110-1 may be located approximately 180 degrees around the cylindrical body 102 with respect to the second cavity 110-2. Further, the first conduit 106-1 and the second conduit 106-2 may include the first sloped portion 202-1 and the second sloped portion 202-2 that create incline planes that may be used to assist in the movement of material by the auger 100.

At one side of each channel 104, at least one, and, in one example, a plurality of cusps 112-1, 112-2 may be formed. A first cusp 112-1 and a second cusp 112-2 may be referred to herein generally as cusps(s) 112. In one example, the cusps 112 may extend to a distance equal or approximately equal to an annular extent (e.g., outer radius or circumferential perimeter) of the auger 100. In one example, the cusps 112 may extend to a distance equal or approximately equal to an outer surface of the conduits 106. In one example, the cusps 112 may extend to a distance equal or approximately equal to an internal diameter of the cylindrical housing in which the auger 100 is housed. In one example, the cusps 112 may extend to a distance that equal to or less than a greatest extent of a distal cutting edge of the first end mill 108-1 and the second end mill 108-2.

The first cavity 110-1 and the second cavity 110-2 may be formed such that the first end mill 108-1 and the second end mill 108-2 coupled to the first cavity 110-1 and the second cavity 110-2, respectively, are at least one of aligned with an axis of the cylindrical body 102, have a positive rake angle, have an axial rake angle, or combinations thereof. As used in the present specification and in the appended claims, the term “rake” or similar language is meant to be understood broadly as an angular relationship between a distal end of the first end mill 108-1 and the second end mill 108-2 or a tangent to the distal end of the first end mill 108-1 and the second end mill 108-2 at a given point and a reference plane or line such as a tangent of the cylindrical body 102. As used in the present specification and in the appended claims, the terms “axial rake,” “axial rake angle,” or similar language is meant to be understood broadly as an angle formed by a plane passing through the axis of the cylindrical body 102 and a line coinciding with or tangent to the distal end of the first end mill 108-1 and the second end mill 108-2.

As used in the present specification and in the appended claims, the terms "positive rake," "positive rake angle," or similar language is meant to be understood broadly as an instance in which the face of the auger slopes away from the cutting edge of the first end mill 108-1 and the second end mill 108-2 at and inner side. Stated another way, the terms "positive rake," "positive rake angle," or similar language is meant to be understood broadly as an instance where the cutting edge leads the rake surface. A positive rake angle makes the auger 100 and the first end mill 108-1 and the second end mill 108-2 more sharp and pointed. This reduces the strength of the auger 100, as the small, included angle at the tip of the first end mill 108-1 and the second end mill 108-2 may cause the distal ends of the first end mill 108-1 and the second end mill 108-2 to chip away. A positive rake angle reduces cutting forces and power requirements. Further, a positive rake angle assists in the formation of continuous chips in ductile materials. Still further, a positive rake angle may assist in avoiding the formation of a built-up edge.

The first end mill 108-1 and the second end mill 108-2 may be indexable with respect to the first cavity 110-1 and the second cavity 110-2, respectively. As used in the present specification and in the appended claims, the term "indexable" or similar language is meant to be understood broadly as being able to be replaced and positioned in an identical orientation and location within the first cavity 110-1 and the second cavity 110-2, respectively, upon replacement. The auger 100, as an indexable tool, provides the ability to renew the cutting edge (e.g., the first end mill 108-1 and the second end mill 108-2) without having to remove the auger 100 from production. Renewal of the cutting edge may be performed by unclamping or otherwise disengaging the first end mill 108-1 and the second end mill 108-2 from the first cavity 110-1 and the second cavity 110-2, respectively, and turning or flipping the first end mill 108-1 and/or the second end mill 108-2 (e.g., indexing) to a fresh cutting edge or replacing the first end mill 108-1 and/or the second end mill 108-2 when completely worn with new, replacement first end mills 108-1 and second end mills 108-2.

In one example, the auger 100 may further include at least one, and in one example, a plurality of coupling devices 120 to couple the end mills 108 to the cavities 110. In one example, the coupling devices 120 may include clamps, fasteners, other coupling devices and combinations thereof that allow the end mills 108 to be electively removed and/or replaced. Access to the coupling devices 120 may be provided via the first conduit 106-1 and the second conduit 106-2 as depicted in, for example, FIGS. 1, 2 and 4.

The auger may further include a center aperture 116 defined in the cylindrical body 102 along the central axis of the cylindrical body 102 and at a center of the cylindrical body 102. The center aperture 116 may engage with a drive shaft 502 coupled to a motor 504 that together drive the auger 100 and cause the auger 100 to rotate about the drive shaft 502.

The auger 100 may further include a first primary alignment aperture 118-1 defined in a first end (e.g., top 114) of the cylindrical body 102. A second primary alignment aperture 118-2 may also be defined in the first end (e.g., top 114) of the cylindrical body 102. The auger 100 may further include a first secondary alignment aperture 304-1 defined in a second end (e.g., bottom 302) of the cylindrical body 102 opposite the first end (e.g., top 114). Further, a second secondary alignment aperture 304-2 may be defined in the second end of the cylindrical body 102. As described herein, the first primary alignment aperture 118-1, second primary alignment aperture 118-2, first secondary alignment aperture 304-1, and second secondary alignment aperture 304-2 may interlock with one another in order to align the axis of two separate augers 100. In one example, a coupling device such as interlocking dowels may be used to couple two augers 100 together. In one example, the first primary alignment aperture 118-1 and second primary alignment aperture 118-2 may be offset by approximately 36 degrees to accommodate for modular auger alignment and to create self-alignment and torque-alignment. Thus, in examples where ten separate augers 100 are coupled together, a full 360 degree turn may be achieved as to the channels 104, the conduits 106, and the cavities 110.

Turning to FIGS. 5 and 6, an auger system 500 is illustrated. The auger system 500 may include a first auger 100-1, a drive shaft 502, and a second auger 100-2 axially coupled to the first auger 100-1 via the drive shaft 502. The drive shaft may be driven by a motor 504 as described herein. In this manner, the first auger 100-1 and the second auger 100-2 may be coupled together and rotated about the drive shaft 502. As the first auger 100-1 and the second auger 100-2 are rotated, the first end mill 108-1 and the second end mill 108-2 of each of the first auger 100-1 and the second auger 100-2 may scrape material such as frozen cryogenic fluid from an interior wall of a cylindrical housing. The scraping of the cryogenic fluid from an interior wall of a cylindrical housing forms a slurry that may be used for, for example, therapeutic processes. The first auger 100-1 and the second auger 100-2 may also cause the slurry to be forced from one end of the cylindrical housing to a second end of the cylindrical housing due to the incline plane formed by the first channel 104-1, the second channel 104-2, the first sloped portion 202-1 of the first conduit 106-1, and the second sloped portion 202-2 of the second conduit 106-2 of the first auger 100-1 and the second auger 100-2. The first channel 104-1, the second channel 104-2, the first sloped portion 202-1 of the first conduit 106-1, and the second sloped portion 202-2 of the second conduit 106-2 of the first auger 100-1 and the second auger 100-2 are helically aligned to allow for fluid and slurry to flow as the first auger 100-1 and the second auger 100-2 are rotated.

The first auger 100-1 may include a first cylindrical body 102, a first channel 104-1 helically defined in the first cylindrical body 102, and a second channel 104-2 helically defined in the first cylindrical body 102. The first auger 100-1 may also include a first conduit 106-1 defined in the first cylindrical body 102. The first conduit 106-1 may include a first sloped portion 202-1. The first auger 100-1 may also include a second conduit 106-2 defined in the first cylindrical body 102. The second conduit 106-2 may include a second sloped portion 202-2. The first auger 100-1 may also include a first end mill 108-1 formed in a first cavity 110-1 defined in the first cylindrical body 102, and a second end mill 108-2 formed in a second cavity 110-2 defined in the first cylindrical body 102.

The second auger 100-2 may include a second cylindrical body 102, a third channel helically defined in the second cylindrical body 102, and a fourth channel helically defined in the second cylindrical body 102. The second auger 100-2 may also include a third conduit similar or identical to the first conduit 106-1 defined in the second cylindrical body 102. The third conduit may include a third sloped portion similar or identical to the first sloped portion 202-1. The second auger 100-2 may also include a fourth conduit similar or identical to the second conduit 106-2 defined in the second cylindrical body 102. The fourth conduit may include a fourth sloped portion similar or identical to the second sloped portion 202-2. The second auger 100-2 may further include a third end mill similar or identical to the first end mill 108-1 formed in a third cavity similar or identical to the first cavity 110-1 defined in the second cylindrical body 102. The second auger 100-2 may further include a fourth end mill similar or identical to the second end mill 108-2 formed in a fourth cavity similar or identical to the second cavity 110-2 defined in the second cylindrical body 102.

In one example, the conduits 106 (106-1, 106-2) of one auger 100-1, 100-2 may open into a cavity 110 (110-1, 110-2) of the other auger 100-1, 100-2. For example, the third conduit of the second auger 100-2 may open into the first cavity 110-1 of the first auger 100-1 as depicted in FIG. 5 for example. Similarly, the fourth conduit of the second auger may open into the second cavity 110-2 of the first. In this manner, the slurry captured within the conduits 106 of one auger 100-1, 100-2 may be fed in the cavities 110 (110-1, 110-2) of neighboring augers 100-1, 100-2 and cause the slurry to be forced through the auger system 500 and the cylindrical housing surrounding the auger system 500.

The first auger 100-1 may further include a first primary alignment aperture 118-1 defined in a first end (e.g., top 114) of the first auger 100-1, a second primary alignment aperture 118-2 defined in the first end (e.g., top 114) of the first auger 100-1, a first secondary alignment aperture 304-1 defined in a second end (e.g., bottom 302) of the first auger 100-1 opposite the first end (e.g., top 114), and a second secondary alignment aperture 304-2 defined in the second end (e.g., bottom 302) of the first auger 100-1.

Similarly, the second auger 100-2 may further include a third primary alignment aperture similar or identical to the first primary alignment aperture 118-1 defined in a first end (e.g., top 114) of the second auger 100-2, and a fourth primary alignment aperture similar or identical to the second primary alignment aperture 118-2 defined in the first end (e.g., top 114) of the second auger 100-2. The second auger 100-2 may further include a third secondary alignment aperture similar or identical to the first secondary alignment aperture 304-1 defined in the second end (e.g., bottom 302) of the second auger 100-2 opposite the first end (e.g., top 114), and a fourth secondary alignment aperture similar or identical to the second secondary alignment aperture 304-2 defined in the second end (e.g., bottom 302) of the second auger 100-2.

The auger system 500 may further include a first coupling device coupling the first auger 100-1 to the second auger 100-2 via the first coupling device engaging with the first primary alignment aperture 118-1 of the second auger 100-2 and the third secondary alignment aperture of the first auger 100-1. Similarly, the auger system 500 may further include a second coupling device coupling the first auger 100-1 to the second auger 100-2 via the second primary alignment aperture 118-2 of the second auger 100-2 coupling to the fourth secondary alignment aperture of the first auger 100-1. The first coupling device and the second coupling device may, on one example, include at least one, and, in one example, a plurality of interlocking dowels interfacing with the first primary alignment aperture 118-1, the third secondary alignment aperture, the second primary alignment aperture 118-2, and the fourth secondary alignment aperture, of the first auger 100-1 and the second auger 100-2, respectively.

When aligned via the first primary alignment aperture 118-1, the third secondary alignment aperture, the second primary alignment aperture 118-2, and the fourth secondary alignment aperture, of the first auger 100-1 and the second auger 100-2, respectively, and the first coupling device and the second coupling device, the first channel 104-1 helically defined in the first auger 100-1 aligns with the third channel helically defined in the second auger 100-2, and the second channel 104-2 helically defined in the first auger 100-1 aligns with the fourth channel helically defined in the second auger 100-2. Further, the first conduit 106-1 defined in the first auger aligns with the third conduit defined in the second auger 100-2 and the second conduit 106-2 defined in the first auger 100-1 aligns with the fourth conduit defined in the second auger 100-2.

The first cavity 110-1, the second cavity 110-2, the third cavity, and the fourth cavity are formed such that the first end mill 108-1, the second end mill 108-2, the third end mill, and the fourth end mill coupled to the first cavity 110-1, the second cavity 110-2, the third cavity, and the fourth cavity, respectively, are at least one of aligned with an axis of the first cylindrical body 102 and the second cylindrical body 102, have a positive rake angle, have an axial rake angle, or combinations thereof. The first end mill 108-1, the second end mill 108-2, the third end mill, and the fourth end mill may be indexable with respect to the first cavity 110-1, the second cavity 110-2, the third cavity, and the fourth cavity, respectively. When aligned via the first primary alignment aperture 118-1, the third secondary alignment aperture, the second primary alignment aperture 118-2, and the fourth secondary alignment aperture, of the first auger 100-1 and the second auger 100-2, respectively, and the first coupling device and the second coupling device, the first end mill 108-1, the second end mill 108-2, the third end mill, and the fourth end mill may be axially offset with respect to one another about the circumference of the first auger 100-1 and the second auger 100-2.

The auger system 500 may further include a first center aperture 116 defined in the first cylindrical body 102 along the axis of the first cylindrical body 102 and at a center of the first cylindrical body 102, and a second center aperture 116 defined in the second cylindrical body 102 along the axis of the second cylindrical body 102 and at a center of the second cylindrical body 102. The first center aperture 116 and the second center aperture 116 allow for the drive shaft 502 to be inserted into the first auger 100-1 and the second auger 100-2, axially align the first auger 100-1 and the second auger 100-2, and commonly drive the first auger 100-1 and the second auger 100-2 via the motor 504.

The first conduit 106-1, the second conduit 106-2, the third conduit, and the fourth conduit may be closed with respect to a radial exterior of the cylindrical body 102. When aligned via the first primary alignment aperture 118-1, the third secondary alignment aperture, the second primary alignment aperture 118-2, and the fourth secondary alignment aperture, of the first auger 100-1 and the second auger 100-2, respectively, and the first coupling device and the second coupling device, the first conduit 106-1, the second conduit 106-2, the third conduit, and the fourth conduit may form continuous conduits between the first auger 100-1 and the second auger 100-2.

In one example, the self-aligning and torque transmitting features between the first auger 100-1 and the second auger 100-2 may include a protrusion in the positions of one of the first primary alignment aperture 118-1 and second primary alignment aperture 118-2 or the first secondary alignment aperture 304-1 and second secondary alignment aperture

304-2 that interfaces with the opposite one of the first primary alignment aperture 118-1 and second primary alignment aperture 118-2 or the first secondary alignment aperture 304-1 and second secondary alignment aperture 304-2. Stated another way, in one example, the first primary alignment aperture 118-1 and second primary alignment aperture 118-2 may, instead include protrusions protruding from the first end (e.g., top 114) of the cylindrical body 102 that are dimensioned to mechanically couple with the first secondary alignment aperture 304-1 and second secondary alignment aperture 304-2. Conversely, in one example, the first secondary alignment aperture 304-1 and second secondary alignment aperture 304-2 may, instead include protrusions protruding from the second end (e.g., bottom 302) of the cylindrical body 102 that are dimensioned to mechanically couple with the first primary alignment aperture 118-1 and second primary alignment aperture 118-2. In these examples, the coupling device such as interlocking dowels described herein may not be needed as the first auger 100-1 and the second auger 100-2 may be self-aligning via the protrusions and torque applied to one of the first auger 100-1 and the second auger 100-2 may cause the other auger to move with it as the drive shaft 502 is rotated. Further, in this example, the protrusions acting as alignment features interlock the first auger 100-1 and the second auger 100-2 and facilitate alignment of the first auger 100-1 and the second auger 100-2 along a common axis.

FIG. 5 illustrates two modular auger units connected to create a longer auger stem. Any number including a plurality of augers 100 may be coupled together with no limitation to the number of modular augers 100 that are stackable and mechanically coupled to one another. A channel, trough, or pathway is created for the propulsion and expulsion of material such as the fluid and/or slurry to top or bottom of the stack of auger(s) 100 via the channels 104, the conduits 106, and the cavities 110 depending on clockwise or counterclockwise rotation of the auger(s) 100.

CONCLUSION

The examples described herein provide at least, and, in one example, a plurality of augers and an auger system for moving material through a cylindrical housing in which the auger(s) are housed. With the above-described systems and methods, the auger system may effectively pull frozen cryogenic fluid from the inner wall of the cylindrical housing to create a slurry that the auger(s) may also push through the cylindrical housing.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. An auger comprising, in combination:
a cylindrical body having a central axis, a top and a bottom, and an outer circumference;
a first channel helically defined in the cylindrical body;
a second channel helically defined in the cylindrical body;
a first conduit defined in the cylindrical body, the first conduit including a first sloped portion, wherein the first conduit has a top opening at the top, a bottom opening at the bottom, and the top opening is circumferentially offset with respect to the central axis from the bottom opening;
a second conduit defined in the cylindrical body, the second conduit including a second sloped portion, wherein the second conduit has a second top opening at the top, a second bottom opening at the bottom, and the second top opening is circumferentially offset with respect to the central axis from the second bottom opening;
a first end mill formed in a first cavity defined in the cylindrical body; and
a second end mill formed in a second cavity defined in the cylindrical body.

2. The auger of claim 1, wherein the first channel is located approximately 180 degrees around the cylindrical body with respect to the second channel;
the top opening in the first conduit is larger than the bottom opening in the first conduit; and
the second top opening in the second conduit is larger than the second bottom opening in the second conduit.

3. The auger of claim 1, wherein the first conduit is located approximately 180 degrees around the cylindrical body with respect to the second conduit;
the first conduit is helical shaped; and
the second conduit is helical shaped.

4. The auger of claim 1, wherein the top opening and the bottom opening of the first conduit, as well as the second top opening and second bottom opening of the second conduit are annular shaped.

5. The auger of claim 1, wherein the first cavity is located approximately 180 degrees around the cylindrical body with respect to the second cavity;
the first cavity extends from the top of the cylindrical body to the bottom of the cylindrical body; and
the second cavity extends from the top of the cylindrical body to the bottom of the cylindrical body.

6. The auger of claim 1, wherein the first cavity and the second cavity are formed such that the first end mill and the second end mill coupled to the first cavity and the second cavity, respectively, are at least one of aligned with the central axis of the cylindrical body, have a positive rake angle, have an axial rake angle, or combinations thereof; and
wherein the first channel defines part of the outer circumference of the cylindrical body, and the second channel defines another part of the outer circumference of the cylindrical body.

7. The auger of claim 6, wherein the first end mill and the second end mill are indexable with respect to the first cavity and the second cavity, respectively;
a first cusp is defined by one side of the first channel and one side of a first cavity adjacent the first channel; and
a second cusp is defined by one side of the second channel and one side of the second cavity adjacent the second channel.

8. The auger of claim 1, further comprising a center aperture defined in the cylindrical body along the central axis of the cylindrical body and at a center of the cylindrical body.

9. The auger of claim 1, further comprising:
a first primary alignment aperture defined in a first end of the cylindrical body;
a second primary alignment aperture defined in the first end of the cylindrical body;
a first secondary alignment aperture defined in a second end of the cylindrical body opposite the first end; and
a second secondary alignment aperture defined in the second end of the cylindrical body.

10. An auger system comprising:
a first auger;
a drive shaft;
a second auger axially coupled to the first auger via the drive shaft;
wherein the first auger includes:
a first cylindrical body;
a first channel helically defined in the first cylindrical body;
a second channel helically defined in the first cylindrical body;
a first conduit defined in the first cylindrical body, the first conduit including a first sloped portion;
a second conduit defined in the first cylindrical body, the second conduit including a second sloped portion;
a first end mill formed in a first cavity defined in the first cylindrical body;
a second end mill formed in a second cavity defined in the first cylindrical body; and
wherein the second auger includes:
a second cylindrical body;
a third channel helically defined in the second cylindrical body;
a fourth channel helically defined in the second cylindrical body;
a third conduit defined in the second cylindrical body, the third conduit including a third sloped portion;
a fourth conduit defined in the second cylindrical body, the fourth conduit including a fourth sloped portion;
a third end mill formed in a third cavity defined in the second cylindrical body; and
a fourth end mill formed in a fourth cavity defined in the second cylindrical body.

11. The auger system of claim 10, wherein:
the third conduit of the first auger opens into the first cavity of the second auger; and
the second conduit of the first auger opens into the second cavity of the second auger.

12. The auger system of claim 10, wherein:
the first auger further comprises:
a first primary alignment aperture defined in a first end of the first auger;
a second primary alignment aperture defined in the first end of the first auger;
a first secondary alignment aperture defined in a second end of the first auger opposite the first end; and
a second secondary alignment aperture defined in the second end of the first auger; and
the second auger further comprises:
a third primary alignment aperture defined in a first end of the second auger;
a fourth primary alignment aperture defined in the first end of the second auger;
a third secondary alignment aperture defined in a second end of the second auger opposite the first end; and
a fourth secondary alignment aperture defined in the second end of the second auger.

13. The auger system of claim 12, further comprising:
a first coupling device coupling the first auger to the second auger via the first coupling device engaging with the first primary alignment aperture of the first auger and the third secondary alignment aperture of the second auger; and
a second coupling device coupling the first auger to the second auger via the second primary alignment aperture of the first auger coupling to the fourth secondary alignment aperture of the second auger.

14. The auger system of claim 13, wherein the first coupling device and the second coupling device comprise at least one interlocking dowel interfacing with the first primary alignment aperture, the third secondary alignment aperture, the second primary alignment aperture, and the fourth secondary alignment aperture, respectively.

15. The auger system of claim 10, wherein:
the first channel helically defined in the first auger aligns with the third channel helically defined in the second auger; and
the second channel helically defined in the first auger aligns with the fourth channel helically defined in the second auger.

16. The auger system of claim 10, wherein:
the first conduit defined in the first auger aligns with the third conduit defined in the second auger; and
the second conduit defined in the first auger aligns with the fourth conduit defined in the second auger.

17. The auger system of claim 10, wherein the first cavity, the second cavity, the third cavity, and the fourth cavity are formed such that the first end mill, the second end mill, the third end mill, and the fourth end mill coupled to the first cavity, the second cavity, the third cavity, and the fourth cavity, respectively, are at least one of aligned with an axis of the first cylindrical body and the second cylindrical body, have a positive rake angle, have an axial rake angle, or combinations thereof.

18. The auger system of claim 10, wherein the first end mill, the second end mill, the third end mill, and the fourth end mill are indexable with respect to the first cavity, the second cavity, the third cavity, and the fourth cavity, respectively.

19. The auger system of claim 10, further comprising:
a first center aperture defined in the first cylindrical body along an axis of the first cylindrical body and at a center of the first cylindrical body; and
a second center aperture defined in the second cylindrical body along the axis of the second cylindrical body and at a center of the second cylindrical body.

20. The auger system of claim 10, wherein the first conduit, the second conduit, the third conduit, and the fourth conduit are closed with respect to a radial exterior of the first or second cylindrical body.

* * * * *